United States Patent
Elsässer et al.

(10) Patent No.: US 7,418,945 B2
(45) Date of Patent: Sep. 2, 2008

(54) FRESH GAS SYSTEM AND OPERATING METHOD FOR A PISTON ENGINE

(75) Inventors: Alfred Elsässer, Keltern (DE); René Dingelstadt, Stuttgart (DE)

(73) Assignee: MAHLE International GmbH, Stuttgart (DE)

( * ) Notice: Subject to any disclaimer, the term of this patent is extended or adjusted under 35 U.S.C. 154(b) by 0 days.

(21) Appl. No.: 11/728,451

(22) Filed: Mar. 26, 2007

(65) Prior Publication Data

US 2007/0227498 A1     Oct. 4, 2007

(30) Foreign Application Priority Data

Mar. 31, 2006   (DE) ................ 10 2006 015 589

(51) Int. Cl.
*F02D 9/08* (2006.01)
*F02D 9/10* (2006.01)

(52) U.S. Cl. ................ 123/403; 123/336

(58) Field of Classification Search ............ 123/403, 123/316, 672, 679, 683, 687, 336, 184.53, 123/184.42, 184.43, 184.47, 184.48

See application file for complete search history.

(56) References Cited

U.S. PATENT DOCUMENTS 4,509,327 A * 4/1985 Enga ................ 60/274
4,617,896 A * 10/1986 Yoshikawa ............ 123/432
5,299,549 A * 4/1994 Schatz ................ 123/672
2005/0139192 A1   6/2005 Lechner

FOREIGN PATENT DOCUMENTS

| DE | 43 08 931 C2 | 9/1994 |
| DE | 102 52 208 A1 | 5/2004 |
| DE | 103 09 730 A1 | 11/2004 |
| DE | 103 46 830 A1 | 4/2005 |
| EP | 0 547 566 B1 | 6/1993 |
| FR | 2 772 077 | 6/1999 |

OTHER PUBLICATIONS

Pischinger, Prof. Dr.-Ing. Stefan, "Variable Valve Control II", Expert Publishers, pp. 244-260. (Spec, p. 2).

* cited by examiner

*Primary Examiner*—Mahmoud Gimie
(74) *Attorney, Agent, or Firm*—Collard & Roe, P.C.

(57) ABSTRACT

A fresh gas system for a piston engine has a collecting line for supplying fresh air to multiple individual lines. The fresh gas system has the collecting line which is unthrottled and a control unit for actuation of the additional valves is designed so that it subdivides a fresh gas charge of the combustion chamber which depends on the load state into two charging phases (A, B) within an intake time window (T). This is limited by the opening and closing of the intake valve such that it actuates the additional valve to close within the intake time window (T) at a closing point in (TS). This depends on the load state and then actuates it to open at a later opening point in time (TO) that depends on the load state of the piston engine.

12 Claims, 1 Drawing Sheet

FRESH GAS SYSTEM AND OPERATING METHOD FOR A PISTON ENGINE

CROSS REFERENCE TO RELATED APPLICATIONS

Applicant claims priority under 35 U.S.C. §119 of German Application No. 10 2006 015 589.0 filed Mar. 31, 2006.

BACKGROUND OF THE INVENTION

1. Field of the Invention

The present invention relates to a fresh gas system for a piston engine, in particular in a motor vehicle. The invention also relates to an operating method for a piston engine equipped with such a fresh gas system.

2. The Prior Art

EP 0 547 566 B1 discloses a fresh gas system for a piston engine equipped with a collecting line for supplying fresh gas to several individual lines. Each individual line supplies fresh gas to one combustion chamber of the piston engine, with an intake valve being provided for each cylinder of the piston engine for opening and closing a connection between the respective combustion chamber and the respective individual line. In addition, upstream from the intake valve, an additional valve with which the respective individual line can be opened and closed is provided in each individual line.

With the known fresh gas system, the fresh gas supply to the combustion chambers can be influenced with the help of the additional valves so that an increase in temperature beyond the adiabatic final compression temperature is established in the respective cylinder. This operating behavior of the piston engine may also be referred to as heat charging.

DE 43 08 931 C2 discloses an operating method for a piston engine which is known as pulsed supercharging. In this method, the respective intake valve in the respective combustion chamber is closed briefly during an intake stroke of the respective piston. The resulting dynamic flow effects lead to the desired pulsed supercharging of the respective combustion chamber.

In addition, it is also known from Pischinger "Variable Valve Control II," Expertverlag [Expert Publishers], pages 244 to 260, that the fresh gas system in a piston engine can be unthrottled upstream from intake valves, whereby to implement the fresh gas charging, which depends on the respective load state of the piston engine, the opening and closing times of the intake valves are adapted accordingly. It is known in particular that two intake time windows may be implemented for the respective intake valve during an intake stroke of the respective piston, the first of which is at the beginning of the intake stroke while the second intake time window is at the end of the intake stroke. The unthrottled or throttle-free fresh gas system is characterized by the absence of a throttle valve, which is situated in the collecting line in a traditional fresh gas system to throttle the fresh gas supply of the combustion chambers as a function of the current load state of the piston engine in partial-load operation of the piston engine. The throttled fresh gas supply is problematical because considerable charge cycle losses occur and the reduced velocities of flow associated therewith hinder the formation of a mixture. The quality of the combustion process then suffers, leading to comparatively poor emission values and increased fuel consumption values. In the case of throttle-free or unthrottled fresh gas supply, the quality of the combustion process can be improved significantly, which results in reduced emissions and fuel consumption values.

To be able to implement the desired control of the fresh gas charge, i.e., control of the volume of fresh gas when the fresh gas system is unthrottled, the known piston engine operates with an electromagnetic valve control unit, which makes it possible to arbitrarily open and close the intake valves. However, such electromagnetic valve control units are much more expensive than traditional valve drives controlled by camshafts.

SUMMARY OF THE INVENTION

The present invention has the object of providing an improved embodiment of a fresh gas system of the type defined above and an operating method of the type defined above that will allow reduced fuel consumption by the piston engine while being implementable comparatively inexpensively.

This object is achieved according to the present invention.

The invention is based on the general idea of implementing the fresh gas flow control in an unthrottled fresh gas system with the help of additional valves arranged in the individual lines, where the respective additional valve is closed temporarily within an intake time window of the respective intake valve. Through the choice of the respective closing point in time and the respective opening point in time of the additional valve, the quantity of fresh gas or the fresh gas charge required for the respective load state of the piston engine can be adjusted in a targeted manner. Subdividing the fresh gas charge into two charging phases, the first of which ends with the closing of the additional valve while the second phase begins with the renewed opening of the additional valve, is especially important. During the first charging phase, there is more or less a basic charging of the respective combustion chamber, which can advantageously be utilized to form a mixture, for example. With the second charging phase, a desired flow state, e.g., spiral flow and/or tumble flow, can be generated in the combustion chamber in comparatively close proximity to the ignition point in time, which is of crucial importance from the standpoint of pollution emission and efficiency of the combustion process.

Other important features and advantages of the invention are derived from the drawings and the respective description of the figures on the basis of the drawings.

It is self-evident that the features mentioned above and those yet to be explained below may be used not only in the particular combination given but also in other combinations or alone without going beyond the scope of the present invention.

Preferred exemplary embodiments of the invention are depicted in the drawings and explained in greater detail in the following description, where the same reference numerals are used to refer to the same or similar or functionally identical components.

DETAILED DESCRIPTION OF PREFERRED EMBODIMENTS

Figure 1:
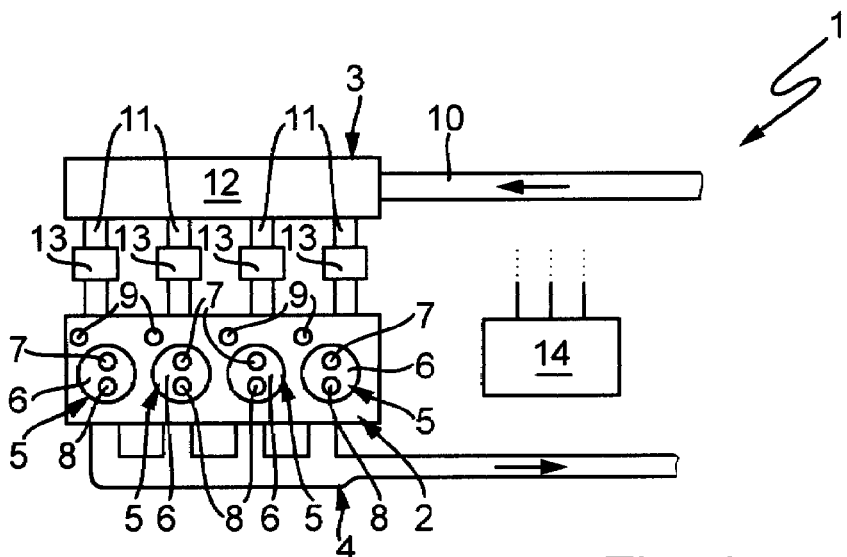
FIG. 1 shows a greatly simplified basic diagram like a circuit diagram of a piston engine.

According to FIG. 1, a piston engine 1 comprises an engine block 2, a fresh gas system 3, which supplies fresh gas to the engine block 2 and an exhaust system 4 that removes the exhaust gas from the engine block 2. The piston engine 1 is preferably arranged in a motor vehicle.

The engine block 2 contains multiple cylinders 5, namely in this example four cylinders 5 (without going beyond the restriction of generality). Each cylinder 5 surrounds a combustion chamber 6 and guides a piston (not shown) in a known manner. At least one intake valve 7 and at least one exhaust valve 8 is assigned to each cylinder 5. The intake valves 7 are designed and arranged in such a way that they can open and close the communicating connection between the respective individual pipe 11 and the respective combustion chamber 6 in the usual manner. No respective valve control is shown here. The gas exchange valves 7, 8 can be controlled in the traditional way by means of camshafts, which can be implemented in a comparatively inexpensive manner. It is likewise possible to provide an electromagnetic valve control. In addition, a fuel injector 9 is provided for each cylinder 5; with suitable control, this fuel injector can inject fuel into the respective combustion chamber 6.

The fresh gas system 3 comprises at least one collecting line 10, which is connected so that it communicates with multiple individual lines 11, whereby each individual line 11 leads to one of the combustion chambers 6. In the present case, the collecting line 10 and the individual lines 11 are interconnected via a fresh gas distributor 12. In another embodiment, the individual lines 11 may also be connected directly to the collecting line 10.

Each collecting line 11 contains an additional valve 13, which is designed so that it can open and close the respective individual line 11. A control unit 14 is provided for operation of the additional valves 13. This control unit 14 has access to signals or information in general which enables it to ascertain the prevailing load state of the piston engine 1. The term "load state" comprises in particular the prevailing load and power output and the prevailing rotational speed of the piston engine 1. For example, the control unit 14 is connected to an engine controller (not shown here). Likewise, the control unit 14 may be integrated into such an engine controller with regard to the hardware or implemented therein with regard to the software. The control unit 14 may also preferably operate the fuel injectors 9.

The exhaust system 4 comprises individual lines, so-called bends which are not identified further here in the usual manner but which are connected here to a common exhaust line via an exhaust collector.

The fresh gas system 3 of the piston engine 1 is unthrottled. This means that no device for throttling the fresh gas supply to the individual combustion chambers 6 is contained in the fresh gas system 3, at least upstream from the additional valves 13. However, the piston engine 1 may fundamentally have a throttle mechanism which does not, however, have any throttle function in the traditional sense during normal operations fundamentally for safety reasons, e.g., for dry-running properties. In particular, the fresh gas system 3 does not have a throttle valve in its collecting line 3. Consequently, essentially ambient pressure prevails in the line system of the fresh gas system 3, optionally throttled by an air filter, and/or the suction pressure generated by the suction intake of the individual cylinders 5 during an intake stroke of the respective piston, if this suction pressure is allowed to pass by the additional valves 13 into the remaining line system of the fresh gas system 3. The low reduced pressure optionally prevailing due to said slight throttling is at any rate much smaller in amount than a reduced pressure prevailing with a conventional throttle valve system.

Figure 2:
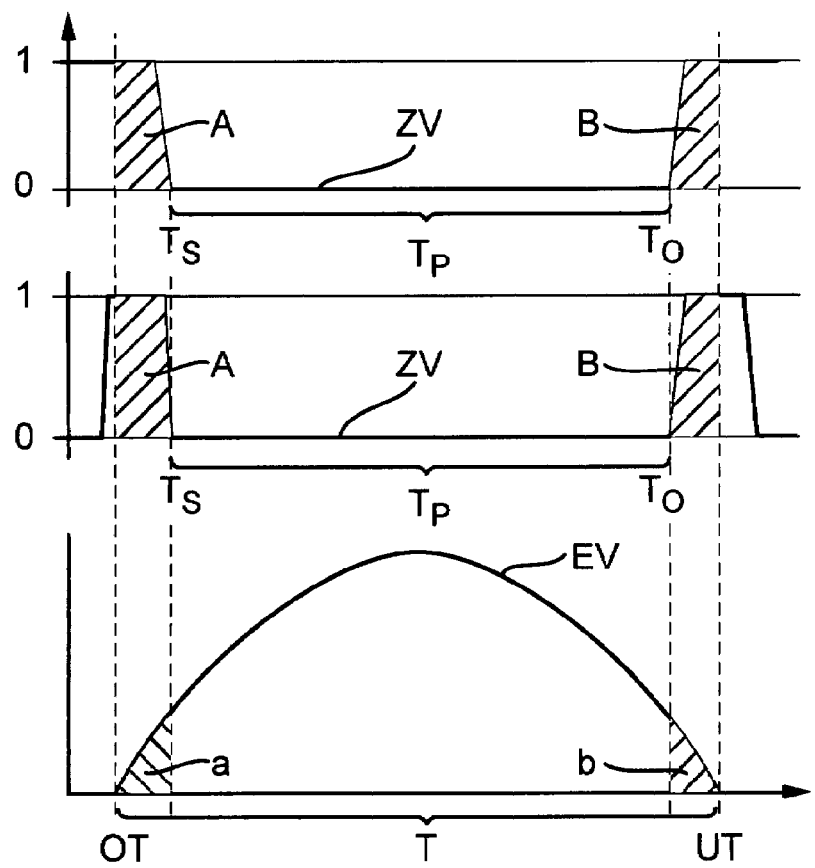
FIG. 2 shows a diagram in which the switch states of an intake valve and of an additional valve are given as a function of the piston stroke.

FIG. 2 shows as an example on the abscissa a detail of a piston stroke, namely an intake stroke which begins at top dead center TDC of the respective piston and ends at bottom dead center BDC of the piston. The curves of the intake valve 7 and the additional valve 13 are plotted on the ordinate as a function of the intake stroke of the respective piston, so they are offset in relation to one another with the respective combustion chamber 6. The curve of the intake valve 7 is labeled as EV. Two different variants of the curve labeled as $ZV_I$ and $ZV_{II}$, are shown for the additional valve 13.

The closed additional valve 13 is represented by a zero line in the diagram, whereas the opened additional valve 13 is represented by a unit value line. The additional valves 13 thus have only two switch states "OPEN" and "CLOSED" during operation, which differentiates the additional valves 13 from throttle valves.

The control unit 14 is designed so that it can control the additional valves 13 for implementation of an operating method for the piston engine 1, which is explained in greater detail below.

During operation of the piston engine 1, each piston executes cyclically an intake stroke that begins at top dead center TDC and ends at bottom dead center BDC. The respective intake valve 7 is linked to the piston movement, e.g., via a camshaft control. During the intake stroke, the respective intake valve 7 has an intake time window T, indicated by a curly French bracket in FIG. 2. The intake time window T is bordered at its beginning by the opening of the intake valve 7 and at its end by the closing of the intake valve 7. Without any restriction on generality, in the present case the opening of the intake valve 7 takes place at top dead center TDC of the piston stroke, whereas the closing of the intake valve 7 takes place at the bottom dead center BDC of the piston. Thus in the example shown here, the intake time window T coincides with the intake stroke of the respective piston. In FIG. 2 the curve of the opening and/or closing movements of the intake valve 7 is represented by the curve EV.

During the intake stroke of the piston, the respective combustion chamber 6 must be charged with fresh gas. The fresh gas quantity, i.e., the fresh gas charge to be introduced into the combustion chamber 6 depends on the prevailing load state of the piston engine 1.

The present invention proposes subdividing the fresh gas charge into two charging phases in partial-load operation of the piston engine 1, where FIG. 2 shows an initial charging phase which comes earlier in time and is labeled as A, while the second charging phase which comes later in time is labeled as B. To implement these two charging phases A, B, the respective additional valve 13 is closed when the intake valve 7 is opened, i.e., it is closed at a closing point in time $T_S$ within the intake time window T and is not opened again until a later opening point in time $T_O$, whereby the window T. Both the closing point in time $T_S$ and the opening point in time $T_O$ depend on the prevailing load state, i.e., the rotational speed of the piston engine 1. The first charging phase thus begins with the opening of the intake valve 7, i.e., at top dead center here, and ends with the closing time $T_S$. Similarly, the second charging phase B begins with the opening of the intake valve 13, i.e., at the opening point in time $T_O$, and ends with the closing of the intake valve 7, i.e., at bottom dead center BDC here. An interval of time between the charging phases A, B is also referred to below as the charging pause $T_P$. The charging pause $T_P$ also depends on the prevailing load state including the rotational speed rpm of the piston engine 1.

The lowest engine load is in idling mode. In idling mode, the intervals are minimal between the opening of the intake valve 7 and the closing of the additional valve 13 on the one hand and the opening of the additional valve 13 and the closing of the intake valve 7 on the other hand. At the same time, the charging pause $T_P$ is maximal in idling mode. The charging phases A, B thus have their shortest duration in idling mode. With an increase in engine load, the individual combustion processes require more fresh gas, so that at least one or both charging phases A, B become(s) longer in time with an increase in engine load, while the charging pause $T_P$ becomes smaller. Thus the closing point in time $T_S$ and/or the opening point in time $T_O$ is advanced in the direction of early with an increase in engine load. Thus, either both charging phases A, B are increased by shifting the points in time $T_S$, $T_O$ with an increase in engine load or only one of the charging phases A, B is increased due to the shifting of one of the points in time $T_S$, $T_O$.

For partial load mode of piston engine 1 with an unthrottled fresh gas system 3, it is noteworthy that advantageous flow states are also established with the very short charging phases A, B. In full-load operation, the unthrottled fresh gas system 3 is especially advantageous because it allows adequate fresh gas charging even with a short intake time window T.

As shown by the curves $ZV_I$, $ZV_{II}$, of the additional valve 13, the control unit 14 controls the respective additional valve 13 preferably in such a way that it is already opened at the time of opening of the respective intake valve 7 to implement the first charging phase A. According to curve $ZV_I$, this may be implemented by the fact that the additional valve 13 is opened immediately before opening the intake valve 7.

In addition, the control unit 14 can control the additional valves 13 so that they are still open to implement the second charging phase B in closing the respective intake valve 7. In the case of curve $ZV_I$, this is achieved by the fact that the additional valve 13 does not close until immediately after the intake valve 7 has closed.

In the variant with curve $ZV_{II}$, the respective intake valve 13 is controlled by the control unit 14, so that it remains open between two intake time windows T. In other words, the respective additional valve 13 remains open after being opened at opening point in time $T_O$ at which the second charging phase B begins and remains open until it closes in the next intake time window T at the closing point in time $T_S$ and thereby concludes the first charging phase A of this new intake time window T. This variant involves definitely fewer switching operations for the respective additional valve 13, which is advantageous with regard to the durability of the additional valves 13, their energy demand and the computer performance of the control unit 14.

The embodiments explained above with respect to the curves $ZV_I$, $ZV_{II}$ operate with an overlap between the opening phases of the additional valve 13 on the one hand and the opening phase of the intake valve 7 on the other hand. These overlaps are represented as hatched areas in FIG. 2 and are labeled as "a" for the first charging phase A and/or "b" for the second charging phase B. It is noteworthy that extremely small quantities of fresh gas can be controlled with the help of these overlaps a, b. In particular, these overlaps a, b can be adjusted to be shorter in time and therefore significantly shorter than the minimally adjustable opening times for the additional valve 13 and/or for the intake valve 7. This makes it possible to implement charging of the respective cylinder 5 in partial-load operation with very small to extremely small quantities of fresh gas. For the emission and fuel consumption values that are possible, quite significant improvements are therefore achieved.

In another embodiment, it is possible to provide for the control unit 14 to control the respective additional valve 13 for implementation of the first charging phase A so that it is still closed on opening of the respective intake valve 7, so that the additional valve 13 is opened only within the intake time window T. In addition or as an alternative, the control unit 14 may also be designed so that it activates the respective additional valve 13 to close for implementation of the second charging phase B within the intake time window T, so that the respective additional valve 13 is already closed when the respective intake valve 7 is closed. This embodiment may be advantageous with regard to certain charging operations.

In partial-load operation of the piston engine 1, the charging pause $T_P$ may amount to at least 20% or at least 30% or at least 40% or at least 50% of the period of time of the intake time window T. Due to charging phases A, B of a short duration, because of the unthrottled fresh gas system 3, a sufficient fresh gas supply can be implemented, first of all, while in addition, dynamic flow processes can be implemented which support the formation of a mixture and support low emissions and efficient fuel conversion.

To implement full-load operation of the piston engine 1, in the simplest case a respective additional valve 13 may be permanently opened, so that the amount of fresh gas supplied is controlled exclusively by the respective intake valve 7. Likewise, synchronization of the additional valves 13 with the respective intake valve 7 is fundamentally possible, so that the valves open and close simultaneously. In addition, it is also possible to open the additional valve 13 only when the intake valve 7 is opened in full-load operation and/or to close the intake valve 7 only when the additional valve 13 is closed. Due to this control, the fresh gas flow for charging the respective combustion chamber 6 can be optimized.

It is essentially possible in full-load operation to implement pulsed supercharging of the combustion chambers 6 through a corresponding control of additional valves 13.

In a preferred further embodiment, the control unit 14 may be designed and linked to the fuel injectors 9 in such a way that it implements two chronologically separate injection operations during the intake time window T in the respective combustion chamber 6. For example, a first injection quantity may be injected during the first charging phase A or between the two charging phases A, B, while at a separate point in time a second injection quantity is injected during the second charging phase. The first injection quantity may be mixed comparatively well with the fresh gas due to its long dwell time inside the combustion chamber 6. The second injection facilitates the ignitability of the total combustion chamber filling, thereby stabilizing engine operation even at a low load.

The second charging phase B is important in achieving an optimized combustion process because a desired flow situation, which still essentially prevails at the ignition point in time, can be created in the combustion chamber 6 due to the late fresh gas filling which is thus close to the ignition point in time. For example, a spiral flow and/or a tumbling flow can be generated.

The invention claimed is:

1. A fresh gas system for a piston engine (1), in particular in a motor vehicle,
having at least one collecting line (10) to supply fresh gas to multiple individual lines (11),
whereby each individual line (11) supplies fresh gas to one combustion chamber (6) and the piston engine (1),
whereby each cylinder (5) of the piston engine (1) has at least one intake valve (7) for opening and closing a connection between the respective combustion chamber (6) and the respective individual line (11),
whereby in each individual line (11) an additional valve (13) for opening and closing the individual line (11) is arranged upstream from the at least one intake valve (7),
wherein the at least one collecting line (10) is unthrottled, a control unit (14) for actuation of the additional valves (13) is designed so that it subdivides a fresh gas charge of the respective combustion chamber (6), depending on the prevailing load state of the piston engine (1) in the case of partial-load operation of the piston engine (1) and does so within an intake time window (T) that is defined by the opening and closing of the respective intake valve (7), thereby subdividing it into two charging phases (A, B); activating the respective additional valve (13) at a closing point in time ($T_S$), which depends on the prevailing load state of the piston engine (1), to close within the intake time window (T) and at a later opening point in time ($T_O$), which depends on the prevailing load state of the piston (1), activating the valve to open.

2. The fresh gas system according to claim 1, wherein
the control (14) is designed so that the respective additional valve (13) is already opened on opening the respective intake valve (7) and/or
the control (14) is designed so that the respective additional valve (13) is still open when the respective intake valve (7) is closed.

3. The fresh gas system according to claim 1, wherein
the control unit (14) is designed so that the respective additional valve (13) remains open between two successive following intake time windows (T) of the respective intake valve (7).

4. The fresh gas system according to claim 1, wherein
the control unit (14) is designed so that the respective additional valve (13) is still closed when the respective intake valve (7) is opened, and/or
the control unit (14) is designed so that the respective additional valve (13) is already closed when the respective intake valve (7) is closed.

5. The fresh gas system according to claim 1, wherein
the control unit (14) is designed so that in partial-load operation of the piston engine (1) a charging pause ($T_P$) limited by the closing point in time ($T_S$) and the opening point in time ($T_O$) of the respective additional (13) amounts to at least 20% or at least 30% or at least 40% or at least 50% of the period of time of the intake time window (T), and/or
the control unit (14) is designed so that in full-load operation of the piston engine (1), the respective additional valve (13) is opened and closed in synchronization with the respective intake valve (7) or is opened permanently or is only opened or is only closed or is opened only once and is closed only once within the intake time window (T).

6. The fresh gas system according to claim 1, wherein
the control unit (14) is also designed for actuation of the fuel injectors (9) assigned to the cylinders (5) in such a way that it injects two injection quantities of fuel at separate points in time during the intake time window (T) in the respective combustion chamber (6), and/or
the control unit (14) is designed so that a first injection quantity is injected during the first charging phase (A) or between the two charging phases (A, B) and a second injection quantity is injected during the second charging phase (B).

7. A method for operating a piston engine (1), in particular in a motor vehicle, comprising providing the piston engine (1) with a fresh gas system (3) with at least one collecting line (10) which supplies fresh gas to several individual lines (11) which in turn supply fresh gas to one combustion chamber (6) each of the piston engine (1), providing each cylinder (5) of the piston engine (1) with at least one intake valve (7), providing an additional valve (13) in each individual line (11), unthrottling the fresh gas system (3) upstream from the combustion chambers (6), subdividing fresh gas charging of the respective combustion chamber (6) which depends on the prevailing load state of the piston engine (1) during partial-load operation of the piston engine (1) into two charging phases (A, B) within an intake time window (T) that is limited by the opening and the closing of the respective intake valve (7) by the fact that the respective additional valve (13) is closed at a closing point in time ($T_S$), which depends on the current load state of the piston engine (1), within the intake time window (T) and then is opened at an opening point in time ($T_O$) that depends on the current load state of the piston (1).

8. The method according to claim 7, comprising
providing that the respective additional valve (13) is already opened on opening the respective intake valve (7), and/or
providing that the respective additional valve (13) is still open on closing the respective intake valve (7).

9. The method according to claim 7, comprising
providing that the respective additional valve (13) remains open between two intake time windows (T) of the respective intake valve (7).

10. The method according to claim 7, comprising
providing that the respective additional valve (13) is still closed on opening the respective intake valve (7), and/or
providing that the respective additional valve (13) is already closed on closing the respective intake valve (7).

11. The method according to claim 7, comprising
providing that in partial-load operation of the piston engine (1) a charging pause ($T_P$) limited by the closing point in time ($T_S$) and the opening point in time ($T_O$) of the respective additional valve (13) amounts to at least 20% or at least 30% or at least 40% or at least 50% of the period of time of the intake time window (T) and/or
providing that in full-load operation of the piston engine (1), the respective additional valve (13) is opened and closed in synchronization with the respective intake valve (7) or is opened permanently or is only opened or is only closed or is only opened once and only closed once within the intake time window (T).

12. The method according to claim 7, comprising
providing the fuel injectors (9) so that they inject two injection quantities at separate points in time into the respective combustion chamber (6) during the intake time window (T) and/or
injecting a first injection quantity during the first charging phase (A) or between the two charging phases (A, B) and injecting a second injection quantity during the second charging phase (B).

* * * * *